United States Patent
Lin et al.

(10) Patent No.: US 6,552,738 B1
(45) Date of Patent: *Apr. 22, 2003

(54) USER INTERFACE FOR CONTROL OF A DISPLAY DEVICE

(75) Inventors: Walter C. Lin, San Jose, CA (US); Judy K. Lin, San Jose, CA (US)

(73) Assignee: Trident Microsystems, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/443,054

(22) Filed: Nov. 18, 1999

(51) Int. Cl.[7] .............................................. G06F 13/00
(52) U.S. Cl. ...................................... 345/810; 345/145
(58) Field of Search ................................ 345/127, 128, 345/131, 132, 114, 115, 145, 146, 762, 765, 744, 764

(56) References Cited

U.S. PATENT DOCUMENTS

| | | | | |
|---|---|---|---|---|
| 5,874,962 A | * | 2/1999 | De Judicibus et al. ....... | 345/781 |
| 5,986,638 A | * | 11/1999 | Cheng ......................... | 345/145 |
| 6,266,042 B1 | * | 7/2001 | Aratani ........................ | 345/132 |

* cited by examiner

Primary Examiner—Cao (Kevin) Nguyen
(74) Attorney, Agent, or Firm—Gray, Cary, Ware & Freidenrich (57) ABSTRACT

A method and apparatus provide a user interface for control of a display device. A video signal is provided to a display device and a graphic image is displayed by the display device. The video signal may be provided to the display device by a host computer system coupled to the display device. Input to the host computer system is received by a user manipulating the graphic image via an input device. The host computer system responds to the input by communicating a command to the display device, the command for adjusting a parameter of the display device. The parameter may be selected from a group consisting of: brightness, contrast, horizontal orientation, horizontal size, vertical orientation, vertical size, tilt, pincushion, and color tint for the display. The command may be communicated via a data sequence sent to the display device by the host computer system. The data sequence may be encoded onto the video signal sent to the display device by the host computer system. The command may be communicated via a digital protocol which provides for bi-directional communication. The input device may be one or more of: a cursor control device coupled to the computer system; and a keyboard coupled to the computer system. The graphic image may include one or more of: a task window which provides a graphic menu; a graphic representation of the parameter, the graphic representation changing in response to said input by the user; a sliding scale; and a numeric value.

43 Claims, 6 Drawing Sheets

USER INTERFACE FOR CONTROL OF A DISPLAY DEVICE

BACKGROUND OF THE INVENTION

The present invention relates to the field of display devices. More particularly, the present invention relates to the field of control of a display device via a user interface.

Conventionally, a computer system provides video signals to a display device associated with the computer system. A user interface is typically provided to adjust parameters for the display device, such as brightness, contrast, horizontal orientation, horizontal size, vertical orientation, vertical size, tilt, pincushion, and color tint. The user interface is typically provided by the display device and includes controls located directly on a housing for the display device which can be used to adjust the display parameters. The controls are typically rheostat dials or push-button switches which are located at the bottom or side of the display housing and connected to circuitry located within the display housing.

In the case of push-buttons, the circuitry within the display housing typically includes an on-screen display circuit (OSD). The OSD receives input from the push-buttons and, in response, generates graphics and text which overlay any image provided on the display screen by the computer system. The various parameters for the display device are selected and adjusted by further pressing of the push-buttons. To minimize its cost, the OSD typically has limited processing capacity and speed. As a result, the graphics and text provided by the OSD tend to be of relatively low resolution. In addition, the number of push-button switches is typically limited for aesthetic purposes and to minimize their cost. As a result, each push-button may be assigned multiple functions. This, however, requires that the push-buttons be manipulated in specific sequences to perform the adjustments. Accordingly, conventional user interfaces provided to adjust the parameters of a display device tend to be confusing to use.

Parameters relating to the video signals themselves are typically adjusted through a user interface provided by the computer system. Parameters adjusted by this interface may include, for example, a delay time for invoking screen-saver graphics, a number of bits to be utilized for representing various colors (e.g., the color palette), display area and monitor type. This user interface provided by the computer system is in addition to, and separate from, the user interface provided by the display device.

The user interface provided by the computer system is typically accessed through the computer system's "control panel." When the "control panel" is invoked by a user, the computer system provides the user interface by which the user may adjust parameters for the video signals. This is generally accomplished by the user manipulating graphic elements displayed on the display device via input from the user which is typically provided by a keyboard or mouse. This user interface, however, only affects the video signals provided by the computer system and does not provide an ability to adjust any parameters of the display device.

Therefore, what is needed is a user interface for controlling a display device and for adjusting display parameters which does not suffer from the drawbacks of prior user interfaces. It is this end that the present invention is directed.

SUMMARY OF THE INVENTION

The present invention provides a user interface for control of a display device. The invention provides improved graphics to be displayed by the display device for use in making adjustments to parameters of the display device without significant increases in cost. Rather, because the graphics for the user interface may be provided to the display device by a computer system coupled to the display device, an on-screen display circuit (OSD) may be omitted from the display device. Further, the invention allows parameters for the display device to be adjusted by a user manipulating graphic elements via an input device for the computer system, such as a keyboard or mouse. Thus, the invention provides that rheostat dials or push-button switches may be omitted from the display device. Accordingly, the present invention provides a user interface having improved graphics and lower cost and which is less confusing to use than conventional user interfaces.

In one aspect, a method and apparatus provide a user interface for control of a display device. A video signal is provided to a display device and a graphic image is displayed by the display device. The video signal may be provided to the display device by a host computer system coupled to the display device. Input to the host computer system is received by a user manipulating the graphic image via an input device. The host computer system responds to the input by communicating a command to the display device. The command is for adjusting a parameter of the display device.

In another aspect, a display device is provided including a display monitor and a display controller coupled to the display monitor. The display monitor displays a graphic image provided to the display monitor by a host computer system. The display controller receives a command from the host computer system for adjusting a parameter of the display monitor, where the command is in response to input to the host computer system from a user. The input to the host computer may be by the user manipulating the graphic image via the host computer.

The graphic image may include one or more of: a task window which provides a graphic menu; a graphic representation of the parameter, the graphic representation changing in response to said input by the user; a sliding scale; and a numeric value. The command may be communicated via a data sequence sent to the display device by the host computer system. The data sequence may be encoded onto the video signal, the video signal being sent to the display device by the host computer system. The command may be communicated via a digital protocol which provides for uni-directional communication from the host computer system to the display device. Further, the command may be communicated via a digital protocol which provides for bi-directional communication. The digital protocol may be an I$^2$C protocol. The command may be communicated to the display device via a DCC2B interface. The input device may be one or more of: a cursor control device coupled to the computer system; and a keyboard coupled to the computer system. The parameter may be selected from a group consisting of: brightness, contrast, horizontal orientation, horizontal size, vertical orientation, vertical size, tilt, pincushion, and color tint for the display.

DETAILED DESCRIPTION OF A PREFERRED EMBODIMENT

Figure 1:
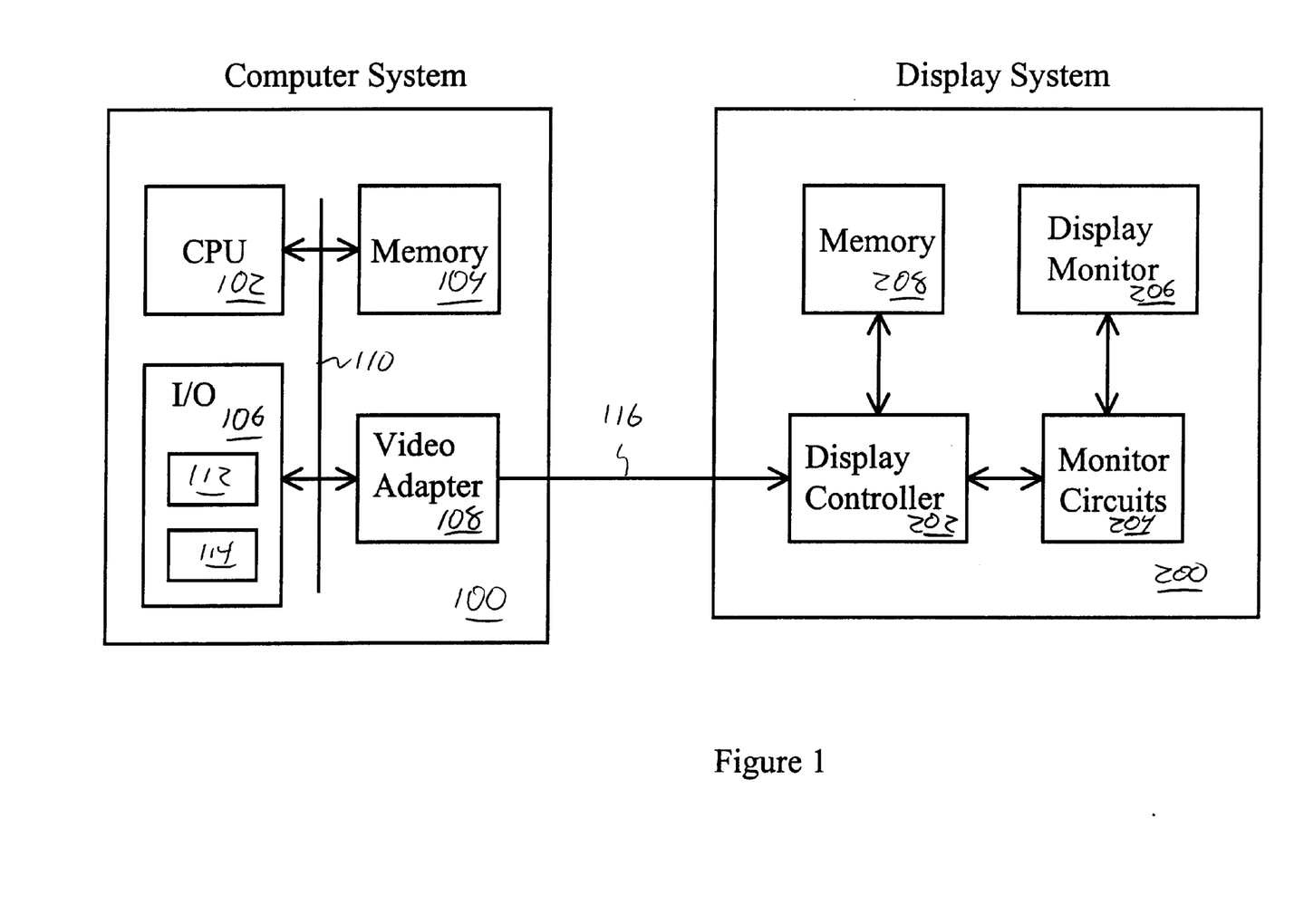
FIG. 1 illustrates a block diagram of a host computer system and a display system in accordance with the present invention.

FIG. 1 illustrates a block diagram of a host computer system 100 driving a display device 200 in accordance with the present invention. The host computer system 100 may include a central processing unit (CPU) 102, a memory 104, input/output (I/O) devices 106 and a video adapter 108, all of which are interconnected by a system bus 110. The memory 104 is conventional and may include random access memory (RAM), read only memory (ROM), a hard disk, a removable media, such as a floppy disk, magnetic tape or optical disk, or other memory device. The I/O devices 106 are conventional and may include a keyboard 112, a cursor control device 114 (e.g., a mouse), a network interface card, a modem, a display monitor, or a printer. It will be apparent that the computer system 100 is conventional and that the particular configuration of the computer system 100 illustrated in FIG. 1 is exemplary.

Data representative of an image to be displayed is typically generated by an application or other program stored in the memory 104 and executed by the CPU 102. The image data may be provided to the video adapter 108 via the system bus 110. The computer system 100 may be coupled to the display system 200 via the video adapter 108 and a video interface 116. The video adapter 106 typically forms video signals which are appropriate for driving the display system 200. The video signals may include red (R), green (G), blue (B), horizontal sync and vertical sync. Alternately, the video signals may be in another format, such as composite video or luminance-chrominance (Y-C) component video. The video interface 116 provides the video signals to the display system 200 and may also provide other signals for control of the display system 200, as explained herein.

As shown in FIG. 1, the display system 200 may include a display controller 202, monitor circuits 204, a display monitor 206 and a memory 208. The display controller 202 may receive the video signals from the computer system 100 and, if necessary, may convert them into form suitable for provision to the monitor circuits 204. The monitor circuits 204 may provide driving signals and control signals for the display monitor 206. For example, assume that the video signals are analog and that the display monitor 206 is a digital display (e.g., a flat panel display). In which case, the display controller 202 may sample the analog signals to form digital samples, while the monitor circuits 204 may receive the digital samples from the display controller 202 and may provide them to the display monitor 206 at an appropriate rate. The memory 208 may include a frame buffer for temporarily storing video data to be displayed by the display monitor 206. Assuming, however, that the display monitor 206 is an analog display (e.g., a cathode ray tube monitor), then the display controller 202 may receive the analog video signals and may perform analog processing on the video signals, if necessary. The display controller 202 may then provide the processed video signals to the monitor circuits 204.

By providing driving signals and control signals to the display monitor 206, the monitor circuits 204 may provide an ability to adjust brightness, contrast, horizontal orientation, horizontal size, vertical orientation, vertical size, tilt, pincushion, color tint and other display parameters for the display monitor 206. These settings may be stored in the memory 208. Alternately, rather than being provided by the monitor circuits 204, an ability to adjust one or more of these parameters may be provided by the display controller 202 or the display monitor 206.

To adjust the display parameters for the monitor 206, the invention provides a display control user interface. The computer system 100 may include a stored software program for implementing this user interface. The user interface software program may be stored in the memory 104 and executed by the CPU 102 when invoked by a user. For example, the interface software may be invoked by the user double-clicking on an appropriate icon displayed by the display monitor 206. Alternately, the user may invoke the user interface software by accessing a "control panel" software program provided by the computer system 100.

Upon commencing execution, the display control user interface software program may cause the computer system 100 to generate video signals which represent a graphic interface for display by the display monitor 206. For example, the graphic interface may include a task window displayed by the display monitor 206.

Figure 2:
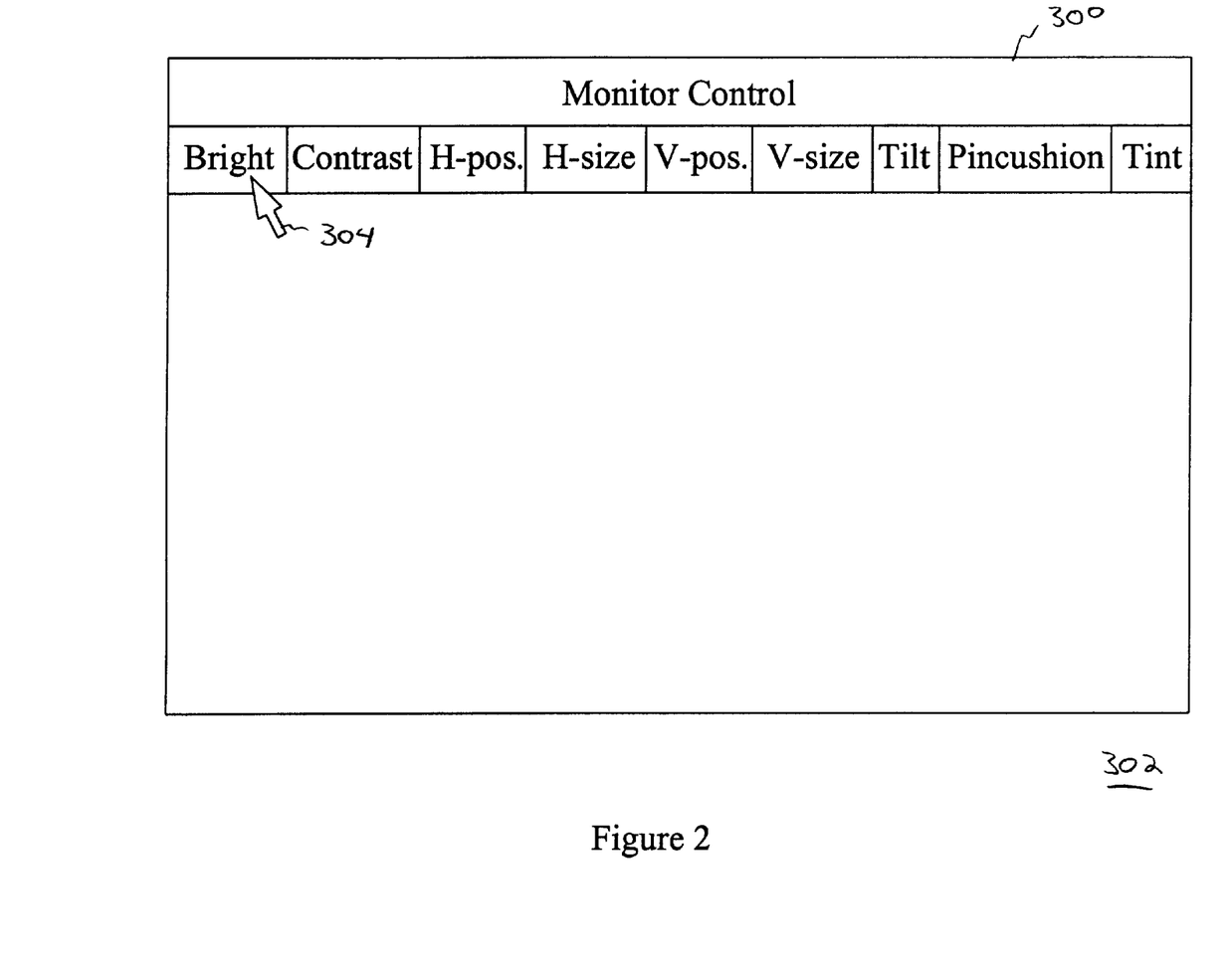
FIG. 2 illustrates a first task window provided for selecting a parameter for a display monitor.

FIG. 2 illustrates an exemplary task window 300 which may be displayed by the display monitor 206 (FIG. 1) for making adjustments to display parameters for the monitor 206. As shown in FIG. 2, the task window 300 may be displayed within a display area 302 or "desktop" of the display monitor 206. The task window 300 may include a menu of parameters which may be adjusted through the user interface. For example, and as shown in FIG. 2, the menu may include: "Bright," for adjusting brightness; "Contrast," for adjusting contrast; "H-pos," for adjusting horizontal position, "H-size," for adjusting horizontal size; "V-pos," for adjusting vertical position, "V-size," for adjusting vertical size; "Tilt," for adjusting tilt orientation of the display image; "Pincushion," for pincushion adjustments for the display; and "Tint," for adjusting color tint for the display. It will be apparent that the arrangement of display parameters shown in FIG. 2 is exemplary and that more, fewer or different display parameters may be selected for adjustment via the user interface.

The user may then select one or more of the display parameters for adjustment. Preferably, this is accomplished by the user providing input to the computer system 100 (FIG. 1), such as by manipulating graphic elements provided by the task window 300 via the computer mouse 114 or keyboard 112. For example, assuming the user wishes to make an adjustment to the brightness setting, the user may position a cursor 304 over the "Bright" menu item and, then, may select the menu item by pressing a button on the mouse 114. Alternately, the user may select the "Bright" menu item by appropriately manipulating the keyboard 112 of the computer system 100.

Figure 3:
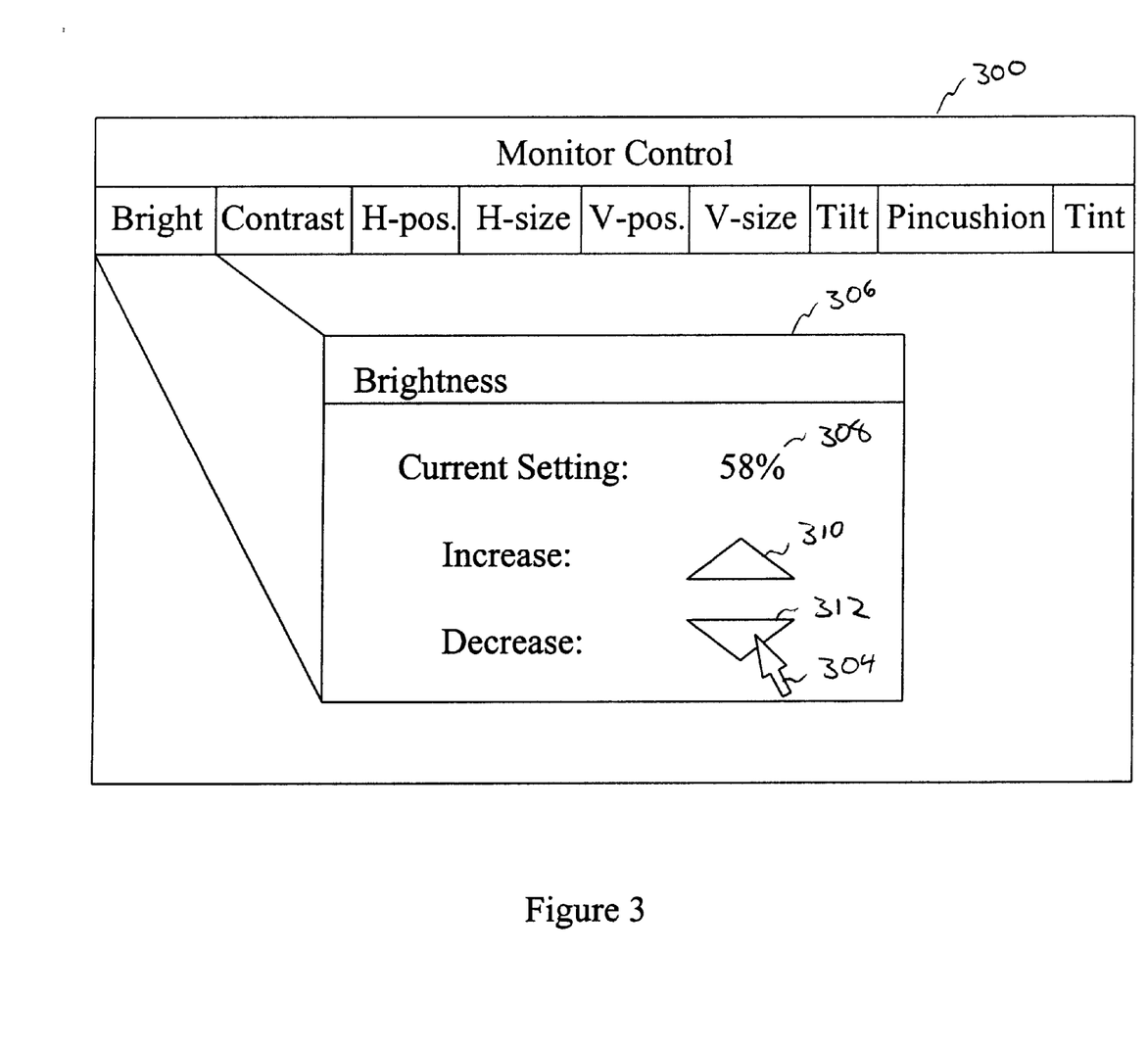
FIG. 3 illustrates a second task window provided for adjusting a selected parameter for the display monitor.

Once a parameter is selected for adjustment via the user interface, the parameter may then be adjusted by further manipulation of graphic elements. FIG. 3 illustrates the window of FIG. 2 after the brightness adjustment has been selected. As shown in FIG. 3, another task window 306, specific to the selected parameter, may be displayed along with the task window 300. The task window 306 of the user interface may display a field 308 in which a current level for the brightness setting (e.g., 58%) is displayed. In addition, graphic elements, such as an upwardly oriented arrow 310 and a downwardly oriented arrow 312, may be displayed. By using the mouse 114 (FIG. 1) or keyboard 114 (FIG. 1) to select the upwardly oriented arrow 310, the brightness level may be increased, while by selecting the downwardly oriented arrow 312, the brightness level may be decreased. As shown in FIG. 3, the cursor 304 is positioned so as to select the downwardly oriented arrow 312; pressing a button on the mouse 114 (FIG. 1) causes the brightness level to be decreased. Assuming a level for the parameter is displayed, such as in the field 308, the displayed level is preferably updated by the computer system 100 when the level is changed.

It will be apparent that a task window similar to the task window 306 may be provided for each parameter for the display monitor 206 that to be adjustable by the user interface. Alternately, different task window may be provided for each display parameter that is adjustable. In addition, it will be apparent that the particular graphics displayed for the interface may be varied from that shown in FIG. 3.

Figure 4:
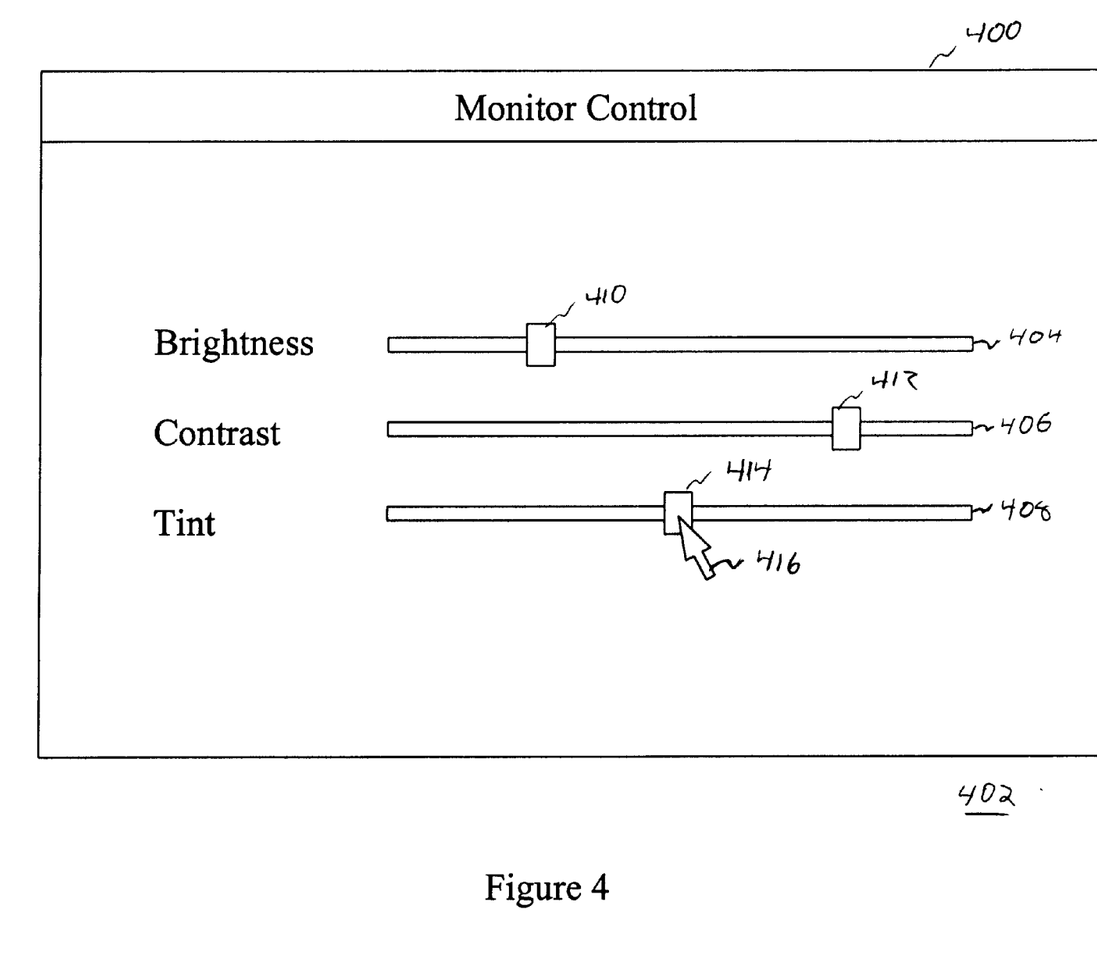
FIG. 4 illustrates a third task window provided for selecting and adjusting a parameter for the display monitor.

FIG. 4 illustrates an alternate task window 400 which may be displayed by the display monitor 206 (FIG. 1) for making adjustments to parameters for the display monitor 206. As shown in FIG. 4, the task window 400 is displayed within a display area 402 or "desktop" of the display monitor 206. The task window 400 may include a displayed selection of parameters along with slide scales 404–408. For each slide scale 404–408, a respective slider 410–414 is also provided which indicates a current setting for the corresponding display parameter. For example, and as shown in FIG. 4, the parameters may include: "Brightness," for adjusting brightness; "Contrast," for adjusting contrast; and "Tint," for adjusting color tint for the monitor 204. It will be apparent, however, that other display parameters may be included within the task window 400. To adjust a parameter via the task window 400 of FIG. 4, the user may manipulate the graphic image displayed by the task window 400. This may be accomplished by the user manipulating the computer mouse 114 to position a cursor 416 over one of the sliders 410–414 which corresponds to the selected parameter. As shown in FIG. 4, the cursor 414 is positioned over the slider 416. Then, the user may hold down a button of the mouse to "drag" the slider 414 to a new position on the corresponding slide scale 408.

Thus, referring again to FIG. 1, the computer system 100 provides video signals to the display system 200 to display a graphic user interface on the display monitor 206 for adjusting display parameters. A user provides input the computer system 100 by manipulating the graphic interface, such as with the mouse 114 or keyboard 112, to select and adjust the display parameters.

Figure 5:
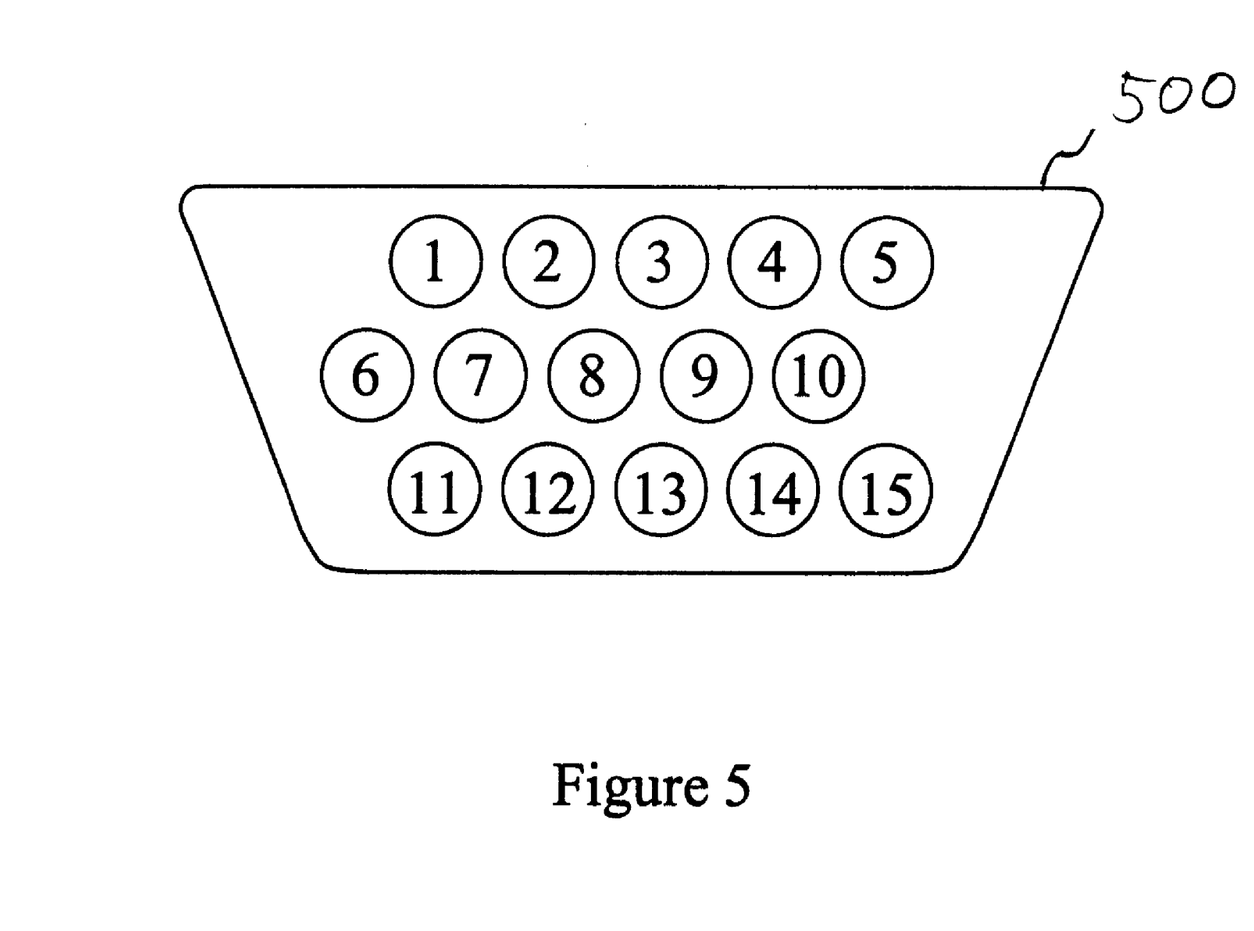
FIG. 5 illustrates a connector for interfacing the host computer system and the display system of FIG. 1.

Then, according to the present invention, in response to the user's input, the computer system 100 may communicate to the display system 200, via the interface 116, the changes to be made to the display parameters. This communication may be accomplished by the interface 116 operating in accordance with a uni-directional protocol for communication from the computer system 100 to the display device 200 or in accordance with a bi-directional protocol. The interface 116 may be a standard interface defined by the Video Electronics Standards Association (VESA). For example, a conventional display data channel interface, known as DCC2B, provides video signals to a display device and also provides bi-directional communication between a host computer system and the display device. FIG. 5 illustrates a connector 500 for implementing the interface 116 in accordance with DCC2B.

The connector 500 may include a plurality of pins numbered 1–15 in FIG. 5. Pin 1 may communicate a red component video signal from the computer system 100 (FIG. 1) to the display system 200 (FIG. 2); Pin 2 may communicate a green component video signal from the computer system 100 to the display system 200; Pin 3 may communicate a blue component video signal from the computer system 100 to the display system 200; Pin 4 may be reserved; Pin 5 may provide a ground reference; Pin 6 may be a ground reference for the red component video signal; Pin 7 may be a ground reference for the green component video signal; Pin 8 may be a ground reference for the blue component video signal; Pin 9 may provide a 5.0 volt reference level from the computer system 100; Pin 10 may provide a ground reference for sync signals; Pin 11 may optionally provide a monitor identification from the display system 200 to the computer system 100; Pin 12 may provide a serial data link for bidirectional communication between the computer system 100 and the display system 200; Pin 13 may provide a horizontal sync or composite sync from the computer system 100 to the display system 200; Pin 14 may provide a vertical sync from the computer system 100 to the display system 200; Pin 15 may provide a clock signal which is synchronous with data sent via Pin 12 for synchronizing the computer system 100 or the display system 200 to data sent by the other via Pin 12. Data may be communicated via the Pins 12 and 15 in accordance with $I^2C$, which is a protocol for bi-directional communication via a serial data line (SDA) and a serial clock line (SCL).

Alternately, the interface 116 may be in accordance with an non-standardized interface (e.g., an interface other than DCC2B) which provides for communication of data from the computer system 100 to the display monitor 200 in addition to the communication of video signals. Such an interface may operate in accordance with the $I^2C$ protocol, or another protocol. In addition, such an interface may utilize a connector other than that shown in FIG. 5 and having alternate pin assignments. In which case, the data communicated from the computer system 100 to the display system 200 may result in changes to display parameters.

Figure 6:
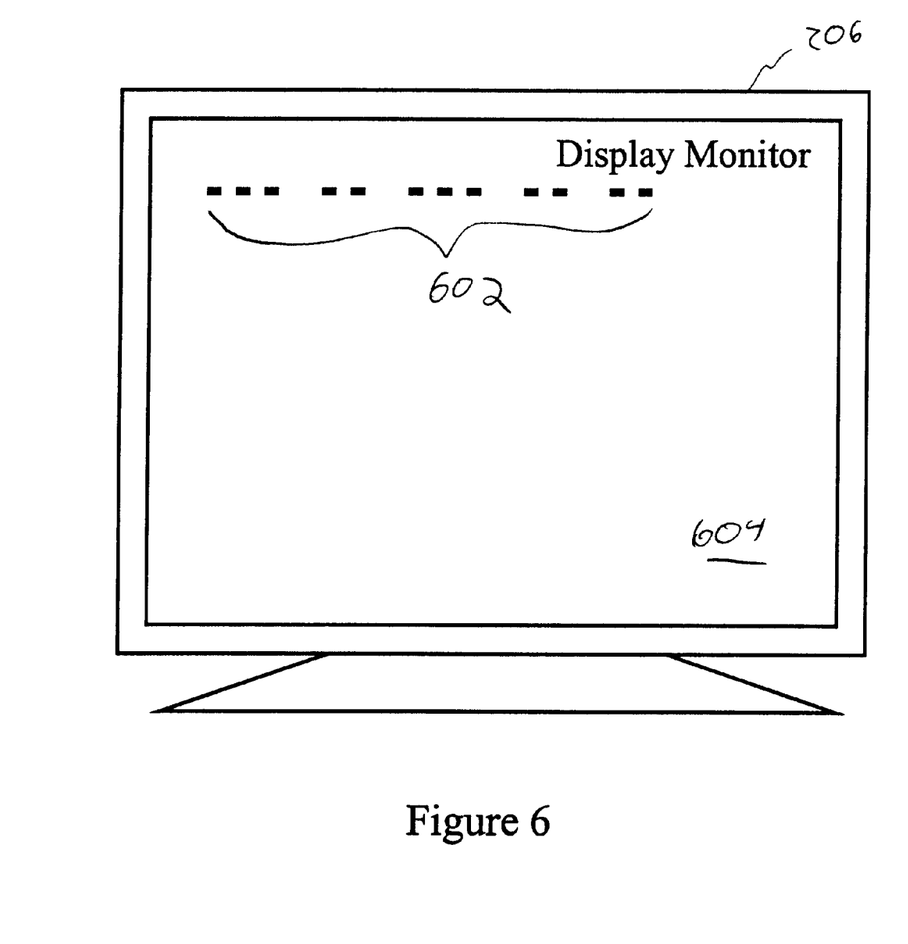
FIG. 6 illustrates an image for the display system including features for communicating digital data from the host computer system the display system.

Further, data may be communicated from the computer system 100 to the display system 200 by encoding the data onto one or more of the signal lines for the red, green and blue video signals (e.g., a data sequence may be encoded onto one or more of video signals utilizing amplitude modulation). In which case, the display controller 202 (FIG. 1) may detect and identify the data sequence by digital sampling of the appropriate one or more of the red, green and blue signal lines. FIG. 6 illustrates an image for the display monitor 206 (FIG. 1) including features 602 for communicating digital data from the host computer system 100 to the display controller 202 in accordance with the present invention. As shown in FIG. 6, the features 602 form a unique pattern (i.e., a data sequence) which is distinguished from background 604 by contrast. It will be apparent that the pattern shown in FIG. 6 is exemplary and that one or more different data sequences may be utilized.

Though the features 702 are displayed by the display monitor 206 in FIG. 6, the data sequence is obtained by the display controller 202 from one or more of the analog video signals. Accordingly, it is not necessary that the features 602 actually appear on the display monitor 206. Rather, the display controller 202 may be conditioned to prevent them from appearing on the display monitor 206. Similarly, the features 602 need only be present in one of the RGB signals to be detected by the display controller 202, though the features 602 may be present in two or three of the RGB signals.

For detecting the features 702, the features 702 may be provided beginning at a predetermined time interval after a pulse in a horizontal signal provided to the display system 200 by the display controller 100 and may be outside of horizontal and vertical blanking intervals.

Thus, data may be communicated from the host computer system 100 to the display system 200 via the interface 116. Once a particular data sequence is identified by the display controller 202, the display controller 202 may respond by adjusting a display parameter identified by the particular sequence. The manner in which the parameter for the display monitor 206 is to be adjusted may also be identified by the data sequence. Accordingly, the display system 200 treats the data sequences as commands. For example, a particular data sequence may command the display system 200 to set a brightness level to 59 percent. As another example, a particular data sequence may command the display system to increase the brightness level by one percent from its current level. The adjustment may then be accomplished by the display controller 202 appropriately configuring the monitor circuits 204. Thus, assuming the brightness level is to be adjusted, the monitor circuits may be conditioned to provide an adjusted voltage level to the display monitor 206 which results in an appropriate adjustment to the brightness level of the monitor 206.

As mentioned, the data may be communicated via the interface 116 (FIG. 1) bi-directionally. For example, the DCC2B interface provides for bi-directional communication. In which case, the display controller 202 preferably returns an acknowledgement in response to successfully receiving a data sequence from the computer system 100. Alternately, the data may be communicated uni-directionally from the computer system 100 to the display monitor 200. For example, encoding of data sequences onto the red, green or blue video signal may provide uni-directional communication of the data sequences. In which case, the computer system 100 may not receive a acknowledgement.

From the foregoing, it should be apparent that the present invention provides an improved a user interface for adjusting parameters of a display monitor. Improvements over conventional techniques include improved graphics, lower cost and ease of use.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of providing a user interface for controlling a parameter of a display device comprising:

providing a video signal to a display device from a host computer, the video signal being adapted to cause the display device to display graphic images;

displaying a graphic image by the display device in response to the video signal received from the host computer, the graphic image being adapted to allow a user to visually adjust a parameter of the display device;

receiving input to the host computer system by a user manipulating the graphic image via an input device; and responding to the input by the host computer system communicating a command signal to the display device, the command signal for adjusting the parameter of the display device.

2. The method according to claim 1, said graphic image including a task window which provides a graphic menu.

3. The method according to claim 1, said graphic image including a graphic representation of the parameter, the graphic representation changing in response to said input by the user.

4. The method according to claim 3, said graphic representation including a sliding scale.

5. The method according to claim 3, said graphic representation including a numeric value.

6. The method according to claim 1, said command signal being communicated via a data sequence sent to the display device by the host computer system.

7. The method according to claim 6, said data sequence being encoded onto the video signal, the video signal being sent to the display device by the host computer system.

8. The method according to claim 1, said command signal being communicated via a digital protocol which provides for uni-directional communication.

9. The method according to claim 1, said command signal being communicated via a digital protocol which provides for bi-directional communication.

10. The method according to claim 9, said digital protocol being an $I^2C$ protocol.

11. The method according to claim 1, said command signal being communicated to the display device via a DCC2B interface.

12. The method according to claim 1, said input device being a cursor control device coupled to the computer system.

13. The method according to claim 1, said input device being a keyboard coupled to the computer system.

14. The method according to claim 1, said parameter being selected from a group consisting of: brightness, contrast, horizontal orientation, horizontal size, vertical orientation, vertical size, tilt, pincushion, and color tint for the display.

15. An apparatus for providing a user interface for controlling a parameter of a display device comprising:

a display device for receiving a video signal for displaying graphic images in response to the video signal; and a host computer system coupled to the display device for providing the video signal, for causing the display device to display a graphic image for adjusting a parameter of the display device, and for receiving input by a user manipulating the graphic image via an input device coupled to the host computer system, the host computer system communicating a command signal to the display device for adjusting the parameter of the display device in response to the input.

16. The apparatus according to claim 15, said graphic image including a task window which provides a graphic menu.

17. The apparatus according to claim 15, said graphic image including a graphic representation of the parameter, the graphic representation changing in response to said input by the user.

18. The apparatus according to claim 17, said graphic representation including a sliding scale.

19. The apparatus according to claim 17, said graphic representation including a numeric value.

20. The apparatus according to claim 15, said command signal being communicated via a data sequence sent to the display device by the host computer system.

21. The apparatus according to claim 15, said data sequence being encoded onto the video signal sent to the display device by the host computer system.

22. The apparatus according to claim 15, said command signal being communicated via a digital protocol which provides for uni-directional communication.

23. The apparatus according to claim 15, said command signal being communicated via a digital protocol which provides for bi-directional communication.

24. The apparatus according to claim 23, said digital protocol being an I$^2$C protocol.

25. The apparatus according to claim 15, said command signal being communicated to the display device via a DCC2B interface.

26. The apparatus according to claim 15, said input device being a cursor control device coupled to the computer system.

27. The apparatus according to claim 15, said input device being a keyboard coupled to the computer system.

28. The apparatus according to claim 15, said parameter being selected from a group consisting of: brightness, contrast, horizontal orientation, horizontal size, vertical orientation, vertical size, tilt, pincushion, and color tint for the display.

29. A display device comprising:
- a display monitor for displaying graphic images in response to video signals provided to the display monitor by a host computer system, including a graphic image for adjusting a parameter of the display monitor; and
- a display controller coupled to the display monitor for receiving a command signal from the host computer system for adjusting a parameter of the display monitor, said command signal being in response to input to the host computer system from a user.

30. The display device according to claim 29, said input to the host computer being by the user manipulating the graphic image via the host computer.

31. The display device according to claim 30, said graphic image including a task window which provides a graphic menu.

32. The display device according to claim 30, said graphic image including a graphic representation of the parameter, the graphic representation changing in response to said input by the user.

33. The display device according to claim 32, said graphic representation including a sliding scale.

34. The display device according to claim 32, said graphic representation including a numeric value.

35. The display device according to claim 29, said command signal being communicated via a data sequence sent to the display device by the host computer system.

36. The display device according to claim 35, said data sequence being encoded onto the video signal, the video signal being sent to the display device by the host computer system.

37. The display device according to claim 29, said command signal being communicated via a digital protocol which provides for uni-directional communication.

38. The display device according to claim 29, said command signal being communicated via a digital protocol which provides for bi-directional communication.

39. The display device according to claim 38, said digital protocol being an I$^2$C protocol.

40. The display device according to claim 29, said command signal being communicated to the display device via a DCC2B interface.

41. The display device according to claim 29, said input device being a cursor control device coupled to the computer system.

42. The display device according to claim 29, said input device being a keyboard coupled to the computer system.

43. The display device according to claim 29, said parameter being selected from a group consisting of: brightness, contrast, horizontal orientation, horizontal size, vertical orientation, vertical size, tilt, pincushion, and color tint for the display.

* * * * *